W. O. OWEN.
DEVICE FOR USE IN FADE PRINTING.
APPLICATION FILED NOV. 11, 1920.
1,397,601.
Patented Nov. 22, 1921.
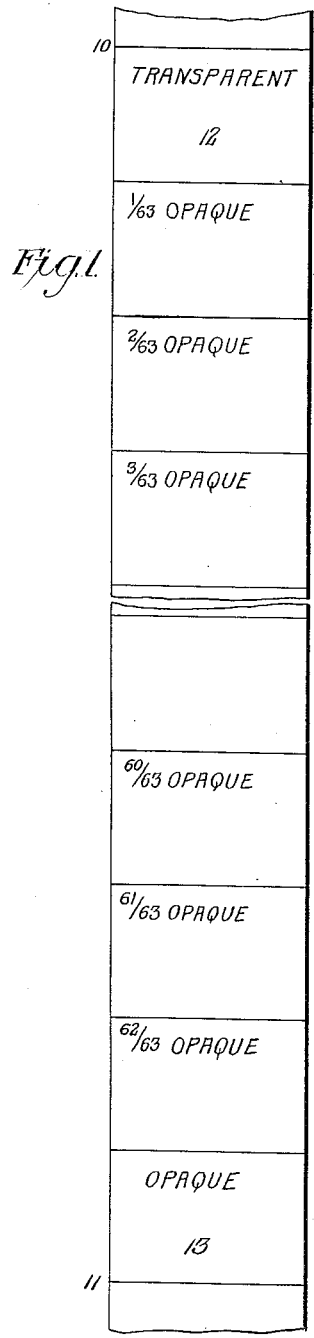
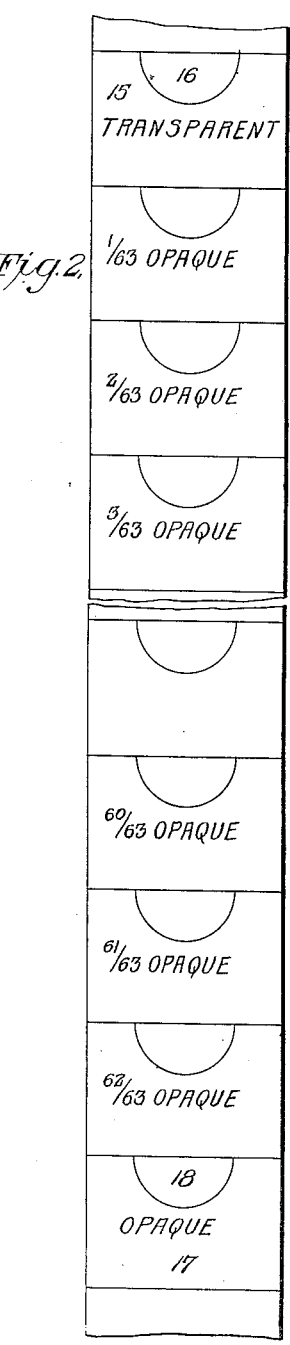
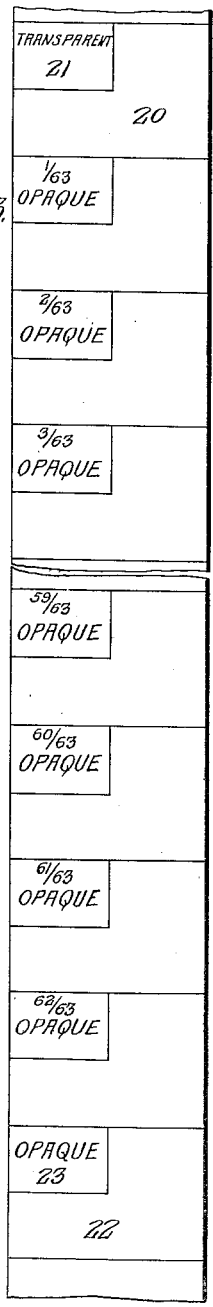

UNITED STATES PATENT OFFICE.

WILLIAM O. OWEN, OF WASHINGTON, DISTRICT OF COLUMBIA.

DEVICE FOR USE IN FADE-PRINTING.

1,397,601.  Specification of Letters Patent.  Patented Nov. 22, 1921.

Application filed November 11, 1920. Serial No. 423,418.

*To all whom it may concern:*

Be it known that I, WILLIAM O. OWEN, a citizen of the United States of America, residing at Washington, District of Columbia, have invented certain new and useful Improvements in Devices for Use in Fade-Printing, of which the following is a specification.

The present invention relates to a structure adapted for use in the production of a fade in effect, a fade out effect or a dissolve, or any combination of these, in the printing of moving picture films.

In my copending application, Serial No. 416,429, filed October 12, 1920, I have described a process of producing a fade in effect, a fade out effect or a dissolve effect, such effects being produced in moving picture films solely in the printing operation. In the process of said application, starting for example with a film negative of approximately standard intensity throughout its length, a portion of the film constituting for example four feet of length of film is selected to form the fade out at the end of a particular scene. The said selected portion of negative is placed over a sensitized film, and the two together are then run through a printing machine, while the amount of light reaching the sensitized film is successively reduced, from one frame to the next, the first frame of the sensitized film receiving such an amount of light as to produce substantially normal intensity of printing, and the last frame of such sensitized film receiving such an amount of light only as will produce substantially no printing effect, and the amount of light which passes through the negative to reach the positive may be regulated in any suitable manner, for example by regulating the source of light.

In the present invention I provide a strip of film which is of such a length as to be suitable for use as a screen in producing this fade out effect in the printing operation, the said screen, when in use, being placed between the source of light and the negative used in making the positive print, which negative is placed between the source of light and the sensitized film which, when developed, is to become the positive film, and the three strips of film are then together run through an ordinary printing machine, in which the amount of light provided at the source preferably remains substantially constant. In such operation, the screen itself will form a barrier to regulate the amount of light admitted through the negative to the sensitized film. The production of a screen suitable for use in this operation, accordingly constitutes the object of the present invention. Further objects in the way of modified construction will appear from the following description.

Referring now to the accompanying drawing, Figure 1 represents a length of film forming a screen, Figs. 2 and 3 represent modifications to be described farther on.

Referring now more particularly to Fig. 1, the screen from the point 10 to the point 11 may comprise a length of four feet, which accordingly may contain 64 frames. The first frame 12 is entirely transparent, or is as near to entirely transparent as can be conveniently produced from such materials as are available for the production of films, and will hereinafter be referred to as "highly transparent." The last frame 13 is sufficiently opaque so that under ordinary printing conditions no such amount of light could pass through this portion of the film, which would be sufficient to produce any substantial effect upon the sensitized film, and this frame will hereinafter be referred to as "highly opaque".

The intermediate frames between 12 and 13 are each a little more opaque than the one directly above it, in other words, an amount of opacity equivalent to about 1/63 of the opacity of the frame 13 is added to each succeeding frame of the film, so that any two adjacent films will vary from each other in opacity, by an amount equal to about 1/63 of the opacity of the frame 13, constituting the bottom frame of the strip. The film can be cut off square at the point 10 and at the point 11, or if desired for convenience in manipulation, a short length (for example a few frames) of film may remain beyond the points 10 and 11, the so remaining frames beyond the point 10 preferably being highly transparent like the frame 12, and the frames beyond the point 11 being highly opaque like the frame 13.

In Fig. 2, I have shown a device suitable for printing a fade, in conjunction with the printing of an inset. In this device the frame 15 may be entirely transparent, or may be entirely transparent except the circular portion 16, which is to constitute the space for an inset while the frame 17 may be highly opaque except the part 18 which is to constitute the space for an inset. The inset portions 16 to 18, inclusive, may be all transparent or all opaque, or may for certain purposes be reversed as to opacity with relation to the main film, that is to say, the inset 18 may be highly transparent, the inset 16 highly opaque and the intermediate insets being of successively increasing opacity between 18 and 16.

In Fig. 3 is shown a still different modification in which the uppermost frame 20 is provided with a rectangular space for an inset 21, and the lowermost frame 22 is provided with a corresponding rectangular space for an inset 23, and the intermediate frames also provided with spaces for insets, the inset spaces themselves being transparent at 21, opaque at 23 and the successive inset spaces being more and more opaque. The main portion of each of the frames from 20 to 22 in this structure may be all transparent or all opaque or may be opaque at 20, transparent at 22 and gradually more and more transparent between these two points.

It is, of course, to be understood that the space corresponding to the inset may be of any desired size and shape relative to the whole frame.

With structures of the above character, I can produce various fade out effects, fade in effects and dissolve effects, both in films having insets and in films not having insets and I can produce the same or similar effects in films having insets, in combination with the same or similar effects in the insets themselves.

The regulated opacity of the film may be produced in any desired manner, a convenient and simple mode of producing the structure of Fig. 1, for example, would be by the employment of an ordinary moving picture camera directed at a brilliant white screen, and gradually reducing the amount of illumination of such screen, from full light down to no light, during the period of time which (say) four feet of film are exposed in the camera, there, of course, being nothing before the screen at all during this operation. This film is then developed in the usual manner.

I claim:

1. A film for fade-printing a moving picturn film, composed of a series of frames each being unprovided with pictures, the frame at one end being highly transparent and the frame at the other end being of sufficient opacity so that the amount of light ordinarily used in printing moving picture films will not penetrate the same, when placed upon a sensitized film, between the light and said sensitized film, sufficiently to produce any substantial effect on said sensitized film, and the intermediate frames being successively more and more opaque from the said highly transparent frame to the said highly opaque frame.

2. A film for fade-printing a moving picture film composed of a series of frames each being unprovided with pictures, a given portion of the frame at one end being highly transparent and the corresponding portion of the frame at the other end being of sufficient opacity so that the amount of light ordinarily used in printing moving picture films will not penetrate such portion of the same, when placed upon a sensitized film between the light and said sensitized film, sufficiently to produce any substantial effect on the corresponding portion of said sensitized film, and the corresponding portions of such intermediate frames being successively more and more opaque from the said frame having said highly transparent portion to the said frame having said highly opaque portion.

3. A device for use in printing moving picture film composed of a series of frames unprovided with pictures, a given portion of the frame at one end of said film being highly transparent and a corresponding portion of the frame at the other end of said film being highly opaque, and the corresponding portions of the intermediate frames of the series being successively more and more opaque from the frame having said highly transparent portion to the frame having said highly opaque portion, such frames also being provided with corresponding spaces adapted to correspond with insets.

In testimony whereof I affix my signature.

WILLIAM O. OWEN.